(12) United States Patent
Carpenter et al.

(10) Patent No.: US 7,899,939 B2
(45) Date of Patent: Mar. 1, 2011

(54) APPARATUS, AND ASSOCIATED METHOD, FOR FACILITATING NETWORK SELECTION USING ACCESS TECHNOLOGY INDICATOR

(75) Inventors: Paul Carpenter, St. Margarets (GB); Adrian Buckley, Tracy, CA (US)

(73) Assignee: Research In Motion Limited, Waterloo (CA)

( * ) Notice: Subject to any disclaimer, the term of this patent is extended or adjusted under 35 U.S.C. 154(b) by 638 days.

(21) Appl. No.: 11/738,081

(22) Filed: Apr. 20, 2007

(65) Prior Publication Data

US 2008/0261655 A1 Oct. 23, 2008

(51) Int. Cl.
- G06F 15/16 (2006.01)
- H04B 1/38 (2006.01)
- H04M 11/00 (2006.01)
- H04W 4/00 (2009.01)

(52) U.S. Cl. .................. 709/250; 455/403; 455/73; 455/434; 370/331

(58) Field of Classification Search .............. 709/250; 370/331
See application file for complete search history.

(56) References Cited

U.S. PATENT DOCUMENTS

| | | | | |
|---|---|---|---|---|
| 7,447,502 | B2 * | 11/2008 | Buckley et al. | 455/434 |
| 2005/0021781 | A1 * | 1/2005 | Sunder et al. | 709/229 |
| 2006/0094427 | A1 * | 5/2006 | Buckley et al. | 455/434 |
| 2006/0095954 | A1 * | 5/2006 | Buckley et al. | 726/2 |
| 2006/0160537 | A1 * | 7/2006 | Buckley et al. | 455/435.2 |
| 2006/0245392 | A1 * | 11/2006 | Buckley et al. | 370/331 |
| 2006/0246899 | A1 * | 11/2006 | Buckley et al. | 455/435.2 |
| 2007/0004402 | A1 * | 1/2007 | Buckley | 455/432.1 |
| 2007/0004404 | A1 * | 1/2007 | Buckley et al. | 455/434 |
| 2007/0004405 | A1 * | 1/2007 | Buckley et al. | 455/434 |
| 2007/0004408 | A1 * | 1/2007 | Buckley et al. | 455/435.2 |
| 2007/0036120 | A1 * | 2/2007 | Zhang et al. | 370/338 |
| 2007/0082697 | A1 * | 4/2007 | Bumiller et al. | 455/552.1 |
| 2007/0143613 | A1 * | 6/2007 | Sitch et al. | 713/171 |
| 2007/0249352 | A1 * | 10/2007 | Song et al. | 455/436 |
| 2007/0265005 | A1 * | 11/2007 | Sitch | 455/435.1 |
| 2008/0151851 | A1 * | 6/2008 | Sitch | 370/338 |
| 2008/0220773 | A1 * | 9/2008 | Buckley | 455/433 |
| 2008/0247346 | A1 * | 10/2008 | Gulbani et al. | 370/310 |
| 2008/0248747 | A1 * | 10/2008 | Buckley | 455/39 |

OTHER PUBLICATIONS

"Universal Mobile Telecommunications System (UMTS)", ETSI Standards European Telecommunication Standards Institute, Sophia Antipolis Cedex, FR. vol. 3-T3, No. V7.6.0, Sep. 2006.

* cited by examiner

Primary Examiner—Saleh Najjar
Assistant Examiner—Vitali Korobov (57) ABSTRACT

Apparatus, and an associated method, for facilitating selection of an I-WLAN PLMN. A PLMN listing is created and maintained at a wireless device. The listing includes entries that identify PLMN together with their associated access technology indicators. The wireless device creates a list of available I-WLAN PLMNs. And a selector and comparator compare identities on the listing together with the list of available I-WLAN PLMNs. Selection is made of a PLMN on both the listing and the list and also exhibits an appropriate access technology capability identified by the access technology indication.

17 Claims, 9 Drawing Sheets

| IDENTIFIER: '6F62' | STRUCTURE: TRANSPARENT | OPTIONAL |
|---|---|---|
| SFI: '13' | | |
| FILE SIZE: 5n (n >= 1) BYTES | UPDATE ACTIVITY: LOW | |
| ACCESS CONDITIONS:<br>  READ          PIN<br>  UPDATE      ADM<br>  DEACTIVATE  ADM<br>  ACTIVATE    ADM | | |

| BYTES | DESCRIPTION | M / O | LENGTH |
|---|---|---|---|
| 1 TO 3 | 1ST PLMN (HIGHEST PRIORITY) | M | 3 BYTES |
| 4 TO 5 | 1ST PLMN ACCESS TECHNOLOGY IDENTIFIER | M | 2 BYTES |
| 6 TO 8 | 2ND PLMN | O | 3 BYTES |
| 9 TO 10 | 2ND PLMN ACCESS TECHNOLOGY IDENTIFIER | O | 2 BYTES |
| ... | | | |
| (5n - 4) TO (5n - 2) | nTH PLMN (LOWEST PRIORITY) | O | 3 BYTES |
| (5n - 1) TO 5n | nTH PLMN ACCESS TECHNOLOGY IDENTIFIER | O | 2 BYTES |

| | | | |
|---|---|---|---|
| 204 | 1 TO 3 | 1ST NETWORK TYPE | M | 3 BYTES |
| 206 | 4 TO 5 | 1ST NETWORK TYPE ACCESS TECHNOLOGY IDENTIFIER | M | 2 BYTES |
| 208 | 6 - X | 2ND NETWORK TYPE IDENTIFIER | O | X |

| IDENTIFIER: '6F62' | STRUCTURE: TRANSPARENT | OPTIONAL |
|---|---|---|
| SFI: '13' | | |
| FILE SIZE: 5n (n >= 1) BYTES | UPDATE ACTIVITY: LOW | |
| ACCESS CONDITIONS: READ    PIN<br>UPDATE    ADM<br>DEACTIVATE    ADM<br>ACTIVATE    ADM | | |

| BYTES | DESCRIPTION | M/O | LENGTH |
|---|---|---|---|
| 1 TO 3 | 1ST PLMN (HIGHEST PRIORITY) | M | 3 BYTES |
| 4 TO 5 | 1ST PLMN ACCESS TECHNOLOGY IDENTIFIER | M | 2 BYTES |
| 6 - X | 2ND TECHNOLOGY TYPE IDENTIFIER | O | X |
| X+1 TO X+3 | 2ND PLMN | O | 3 BYTES |
| X+4 TO X+5 | 2ND PLMN ACCESS TECHNOLOGY IDENTIFIER | O | 2 BYTES |
| X+6-Y | 2ND TECHNOLOGY TYPE IDENTIFIER | O | X |

APPARATUS, AND ASSOCIATED METHOD, FOR FACILITATING NETWORK SELECTION USING ACCESS TECHNOLOGY INDICATOR

The present invention relates generally to a manner by which to perform network-entity selection, such as PLMN (Public Land Mobile Network) selection. More particularly, the present invention relates to apparatus, and an associated method, by which to provide a wireless device with the capability to select a PLMN with which to communicate by way of an intermediary network. The intermediary network, for example, forms an I-WLAN (Interworking Wireless Local Area Network) or other network entity, such as a WiMAX, and LTE, a CDMA2000, EVDO, etc. entity.

A PLMN list or file is maintained at the wireless device. When the wireless device performs scanning operations to make detection, and then make selection, pursuant to PLMN, or other, selection procedures, the PLMN list is accessed. If an available PLMN, or other entity, is available by way of an intermediary network, is also on the PLMN list, and is associated with an appropriate access technology capability, selection is made thereof. And, if a plurality of such PLMNs are available, then further selection is made from amongst them, automatically or manually, pursuant to a prioritization scheme.

BACKGROUND OF THE INVENTION

Advancements in communication technologies have permitted the development and deployment of many varied types of communication systems. Multi-user, radio communication systems are amongst the communication systems that have been developed and deployed making use of the communication technology advancements. A cellular communication system is an exemplary type of radio communication system, the use of which is pervasive in modern society. A cellular communication system, referred to herein as a Public Land Mobile Network (PLMN), is generally constructed to operate in conformity with operational parameters that are set forth in an operating specification. Regulatory bodies have promulgated successive generations of operating standards and corresponding successive generations of cellular communication systems have been deployed that operate in conformity with such operating standards.

The network infrastructures of multiple generations of cellular communication systems might well be installed to encompass, and to be concurrently operable, over common geographical areas. Additionally, network infrastructures of similar cellular communication systems, operated by different network operators might also be installed over common geographical areas. And, additionally, network infrastructures of similar cellular communication systems, operated, e.g., by different network operators might also be installed over a common geographical area.

A Wireless Local Area Network (WLAN) is also an exemplary type of radio communication system. A WLAN is operable, at least in various aspects, in manners that are analogous to operation of cellular communication systems. Wireless local area networks, are, however, generally implemented as small-area systems, encompassing areas that are generally smaller than the areas typically encompassed by a cellular communication system. A wireless local area network, at least in various additional aspects, is a technological extension of a conventional local area network. Both a conventional local area network and a wireless local area network provide generally for the communication of packet-formatted data pursuant to data-intensive packet communication services.

Wireless devices, variously referred to herein as mobile stations and User Equipment (UE), are sometimes capable of selecting with which of the wireless local area network and PLMN to communicate. Additionally, interworking between wireless local area networks and the networks of cellular communication systems is provided so that a wireless device is capable of communicating with a PLMN, by way of a wireless local area network. For example, in an existing I-WLAN (Interworking-Wireless Local Area Network) specification, network selection procedures are defined. The procedures are followed pursuant to selection of a public land mobile network with which the wireless device shall select through which to communicate by way of an I-WLAN. Analogous selection procedures shall likely be used in other radio communication systems, e.g., a system that conforms to Systems Architecture Evolution (SAE) protocols, defined in proposals set forth for a promulgation of 3GPP (Third Generation Partnership Project) standard specification.

A preferred PLMN list, such as a user-selected PLMN list or an operator-selected PLMN list, is sometimes maintained at the wireless device and used pursuant to network selection procedures. The lists identify PLMNs that are preferably selected for communications by the wireless device.

Further, it is generally preferred for the wireless device to communicate with a HPLMN (Home PLMN) associated with the wireless subscription or an equivalent to the HPLMN, referred to as an Equivalent Home Public Land Mobile Network (EHPLMN). However, operators of different WLANs and PLMNs might enter into agreements, exit agreements, combine entities, etc. An EHPLMN is, therefore, not an unchanging, static identification. In at least one scheme, an EHPLMN list is provided to, and maintained at, a wireless device. However, the EHPLMN concept, and its use, has not been extended to I-WLAN operation.

Additionally, access technology capability of, and with, a PLMN is also an important selection criteria. Existing PLMN lists, however, generally identify only cellular access technologies as a capability of the PLMN and do not consider alternate access technologies such as WLAN, or other non-cellular radio technologies, nor the specific use of I-WLANs.

If a manner could be provided by which to extend the concept of an EHPLMN to an I-WLAN, improved communication would be possible.

Likewise, if a manner could be provided by which to better identify at the wireless device the access technology capability associated with a PLMN, improved communication would also be possible.

It is in light of this background information related to radio communications utilizing I-WLANs that the significant improvements of the present invention have evolved.

DETAILED DESCRIPTION

The present invention, accordingly, advantageously provides apparatus, and an associated method, by which to perform I-WLAN PLMN selection in which a wireless device selects a PLMN with which to communicate by way of an I-WLAN. More generally, the present invention provides apparatus, and an associated method, by which to perform network-entity/PLMN selection in a generic radio communication system.

Through operation of an embodiment of the present invention, a manner is provided by which to perform the I-WLAN PLMN selection in which preferred PLMNs, such as EHPLMNs, are identified and considered pursuant to a selection process.

In one aspect of the present invention, a PLMN list or file is created and maintained at the wireless device. The list is formed of entries that identify PLMNs together with their associated access technology capabilities. The PLMN identity and the access technology capability are defined by values populating fields of the list.

In another aspect of the present invention, the PLMN list, once created, is maintained. When the wireless device performs scanning operations to make detection, and then make selection, pursuant to I-WLAN PLMN selection procedures, the PLMN list is accessed. If an available I-WLAN PLMN is available, is also on the PLMN list, and is associated with an appropriate access technology capability, selection is made of the PLMN as the target PLMN. If more than one available PLMN is on the PLMN list and is associated with the appropriate access technology capability, then selection is made from amongst the available PLMNs pursuant to a prioritization and a preference scheme.

In another aspect of the present invention, a PLMN listing is created and maintained at the wireless device. The listing is created at a memory element of the wireless device, embodied, e.g., at a SIM (Subscriber Identity Module), USIM or R-UIM, at a UICC (Universal Integrated Circuit Card), or other removable storage element such as but not limited to compact flash, microSD card, memory stick. The listing comprises, e.g., a user-controlled PLMN selection list or an operator-controlled PLMN selection list. The entries on the listing are, e.g., updateable or changeable by operator or user selection. As the inclusion of a PLMN and associated access technology on the listing is dynamic, updating of the entries on the listing are correspondingly dynamically changeable. Or, the entries in the PLMN listing are provided at the initiation of a service subscription.

In another aspect of the present invention, the wireless device obtains lists of PLMNs available, by way of an I-WLAN, with which communication connectivity is provided. When the wireless device is positioned at a location within the coverage area of more than one WLAN, each WLAN, identified by its respective SSID (Service Set Identifier) and with which the user equipment is able to communicate, is interrogated for its PLMN list.

In another aspect of the present invention, the wireless device interrogates the I-WLAN through generation and transmission of an alternative NAI (Network Access Identifier) that is of a value, or a syntax, that causes the sending of the PLMN list by the I-WLAN that receives the alternate NAI.

In another aspect of the present invention, the wireless device further buffers the PLMN list, sent by each I-WLAN. And, the I-WLAN, identified by its SSID, is indexed together with the PLMNs on each list.

In another aspect of the present invention, comparison is made between the entries contained on the PLMN listing and the PLMNs that are buffered. Comparison identifies a PLMN, if any, that is contained both at the PLMN list and in the buffer and that further is of a desired access technology. If a PLMN is so-identified, then the PLMN becomes a target PLMN. And, the user equipment selectably attempts to form a communication link with the associated I-WLAN, identified by its SSID, and through which communications with the target PLMN are possible.

In another aspect of the present invention, the PLMN listing further identifies a priority, or other preference indication associated with each PLMN of the listing. If a comparison between the buffered PLMN identities and the entries on the PLMN listing results in a plurality of PLMNs that are in common and with the desired access technology, then the prioritization or preference ordering is determinative of which of the PLMNs forms the target PLMN.

In another aspect of the present invention, when a target PLMN is identified, the target PLMN, and its associated I-WLAN, is automatically selected. Alternately, manual selection is performed by providing the user with the results of the comparison together with an opportunity to make selection of the target PLMN. A user interface is provided, such as a display on a user display and an input actuator provided on an input actuation keyboard.

Thereby, the user equipment is better able to make selection of a target PLMN. Communication failure, communication with a non-preferred PLMN, or with a PLMN that does not exhibit an appropriate access technology is less likely to occur.

In these and other aspects, therefore, apparatus, and an associated method, is provided for facilitating network selection at a wireless device. A memory device is configured to store a Public Land Mobile Network, PLMN listing set. The PLMN listing includes a PLMN identity field and an access technology field. A detector is configured to detect I-WLAN, Interworking-Wireless Local Area Network, -associated, PLMN identities delivered to the wireless device. A selector is adapted to receive an indication of the PLMN listing and of detections made by the detector. The selector is configured to permit selection responsive to comparisons made therebetween.

Figure 1:
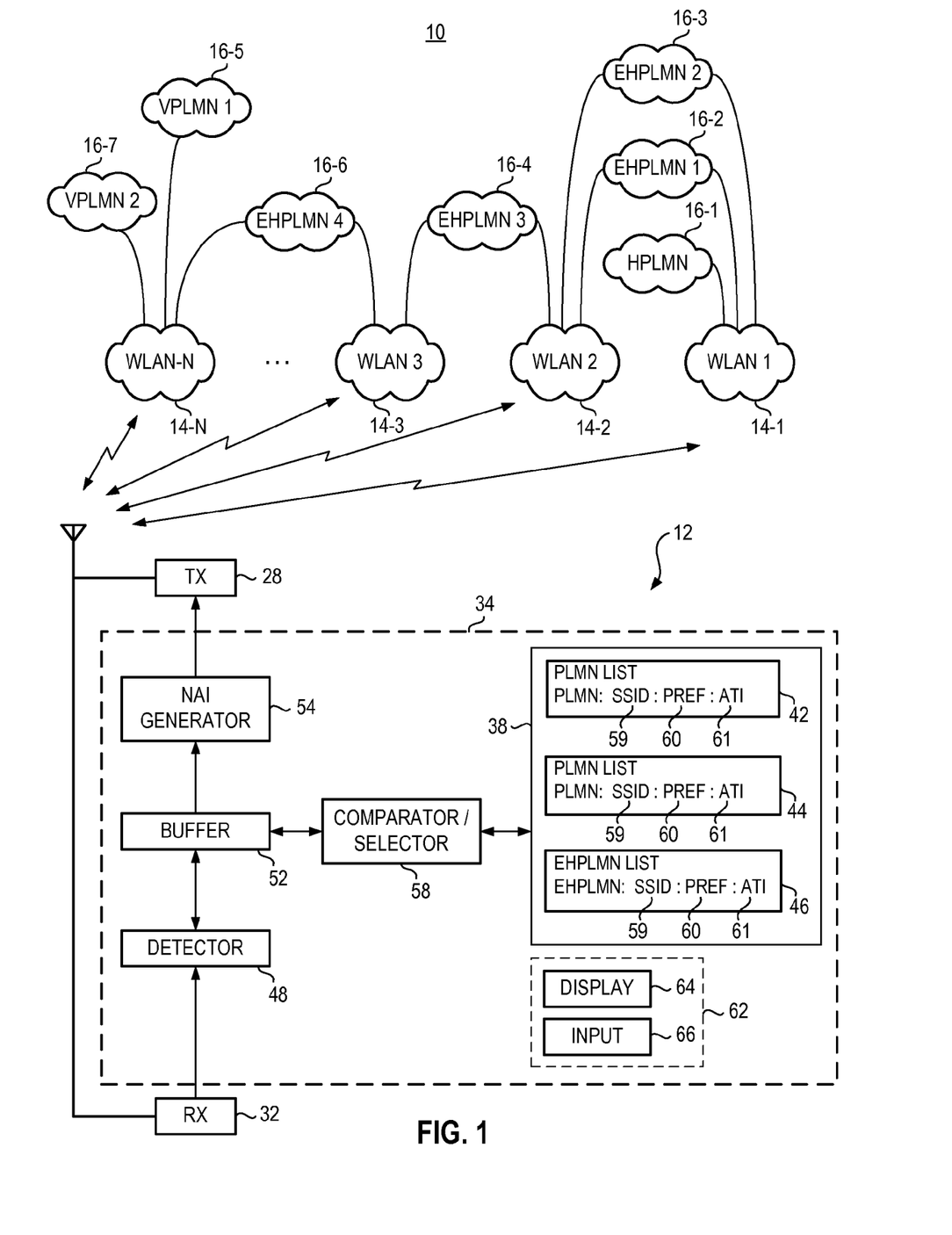
FIG. 1 illustrates a functional block diagram of a radio communication system in which an embodiment of the present invention is operable.

Referring first, therefore, to FIG. 1, a radio communication system, shown generally at 10, provides for radio communications with the wireless devices, of which the user equipment 12 is representative. While the element 12 shall be referred to herein as a user equipment (UE), the wireless device comprises a radio transceiver of configuration to permit its operation in any desired system, such as a UTRAN, a CDMA2000, EVDO, Wi-max system, etc. And, while the wireless device is here shown and described with respect to its implementation as an I-WLAN device, more generally, the wireless device operates to communicate with the network part of any of various other radio communication systems, in addition to the exemplary arrangement shown in FIG. 1 such as but not limited to Wi-Max, LTE, CDMA2000, IS-95, EVDO etc. That is to say, the following description describes an exemplary radio communication system that includes I-WLANs. An embodiment of the present invention is analogously implementable in other types of communication systems. The WLANs/I-WLANs shown or described with respect to, the Figures are more generally representative of any of various network entities. The user equipment 12 is shown to be positioned at a location within the coverage area of a plurality of Wireless Local Area Networks (WLANs) 14. The number of WLANs is merely exemplary. In an actual implementation, and depending upon the positioning of the user equipment, the number of WLANs in whose coverage area that the user equipment is positioned is likely to be different, or at least to be changeable, depending upon the positioning of the user equipment. Here the user equipment is shown to be positioned within the coverage areas of WLAN1 14-1, WLAN2 14-2, WLAN3 14-3, and WLAN-N 14-N.

The WLANs form interworking WLANs, I-WLANs, having interworking unit functionality that provide for communication connectivity with public land mobile networks 16. Again, the number of, and connection configuration of, the public land mobile networks is merely exemplary. The public land mobile networks are variously identified as being a Home Public Land Mobile Network (HPLMN), an Equivalent Home Public Land Mobile Network (EHPLMN), or a Visited Public Land Mobile Network (VPLMN). The designations are made in terms of the designations relative to the user equipment 12. Other user equipment have different ones of the PLMNs variously defined. The different ones of the PLMN 16 exhibit different access technology capabilities. For example, a PLMN here is variously GSM (-only), GSM/GPRS, GSM/GPRS/EDGE, IEEE 802.11, IEEE 802.16, etc. capable.

The WLAN 14-1 is shown to be connected to the HPLMN 16-1, the EHPLMN1 16-2, and the EHPLMN2 16-3. The WLAN2 14-2 is shown to be connected to the EHPLMN1 16-2, the EHPLMN2 16-3, and the EPHLMN3 16-4. The WLAN3 14-3 is shown to be connected to the EHPLMN3 16-4, and the EHPLMN4 16-6. And, the WLAN 14-N is shown to be connected to the EHPLMN4 16-6, the VPLMN1 16-5 and a VPLMN2 16-7.

Through appropriate connection to a WLAN 14, communications are performed with a PLMN. As different ones of the WLANs are connected to different PLMNs, appropriate selection of the WLAN is determinative of communication connectivity with a PLMN. As noted previously, it is generally desirable that the user equipment communicate with its HPLMN or an equivalent HPLMN. Additionally, depending upon the capability of the UE 12 or upon the communication service to be performed, the access technology capability of the PLMN is determinative of the appropriate selection.

The user equipment includes transceiver circuitry, here represented by a transmit part 28 and a receive part 32 and apparatus 34 of an embodiment of the present invention. The apparatus facilitates network selection such that the user equipment is able to select to attempt to communicate with a WLAN that is connected to a PLMN, e.g., an EHPLMN or the HPLMN that exhibits a desired access technology capability. The apparatus is shown to be formed of functional elements, implementable in any desired manner, including algorithms executable by processing circuitry or hardware equivalents thereof. And, while separately shown in FIG. 1, the elements, or portions thereof, are implementable as portions of the transmit and receive parts of the user equipment.

The apparatus includes a memory device 38 that, in the exemplary implementation, forms a storage card, such as but not limited to a SIM card, USIM, R-UIM, Compact flash, MicroSD card, memory stick or a UICC etc. In another implementation, the memory device comprises a non-removable memory element. In another implementation the both non-removable and removable memory exist and the contents of the removable memory is imaged, stored, in the non-removable memory. This requires that the ME be able to read and write to the memory locations of the EHPLMN listing in the removable memory. The memory element maintains a set of listings such as an operator-created PLMN listing 42, a user-created listing 44, and an EHPLMN listing 46. The operator-created listing 42 include PLMN entries of the operator's selection. And the user-created listing 44 include PLMN entries of the user's selection. The EHPLMN listing 46 includes entries that identify EHPLMNs. In the exemplary implementation, the entries are dynamically updateable either by way of over-the-air updating procedures, local entry, or other updating mechanism so that the listings contain up-to-date listings of entries. The network entries are identified, as appropriate, pursuant to the specific protocols by which the individual ones of the networks re operable. The identifier, e.g., comprises an MCC/MNC (Mobile Country Code/Mobile Network Code) defined pursuant to 3GPP standards, an SSID (Service Set Identifier) defined pursuant to IEEE 802.11 standards, an NAI (Network Access Identifier) when a domain name portion is available, or any other appropriate identifier.

The apparatus further includes a detector 48. The detector detects signals broadcast by the respective WLANs and PLMN lists that form part of such signals. When detected, the PLMN lists are buffered at a buffer 52.

In the exemplary implementation, the apparatus also includes an Alternate Network Access Identifier (ANAI) generator 54 that generates an alternative NAI. When transmitted by the transmitter to successive ones of the WLANs 14, the alternative NAI precipitates the return of the PLMN list of the respective WLANs. The PLMN lists each identify the PLMNs directly connected to the respective I-WLANs. The PLMN list each identify the PLMNs directly connected to the respective I-WLANs.

The apparatus further includes a comparator and selector 58. The comparator and selector operates to compare identities stored at the memory device 38 with identities buffered at the buffer 52 and, responsive to such comparisons, select a PLMN and associated I-WLAN with which to communicate. And, responsive to such selection, the transmit and receive parts of the user equipment are caused to operate in manners conforming to the selection made by the comparator and selector.

The exemplary implementation is described with respect to selection of a PLMN from the EHPLMN listing 46. Operation with respect to selection from the listings 42 and 44 is analogous. In the exemplary implementation, the function 58 first determines whether the memory device 38 includes an EPHMLN listing 46 and, if so, further to determine whether the listing includes entries. If the memory device does not include the listing 46 or the listing does not include entries, then the listings 42 or 44 are accessed and utilized pursuant to WLAN and PLMN selection. That is, if the EHPLMN listing is present, then the EHPLMN listing is used if the listing is not present or exists but does not contain any entries, then the HPLMN listing is used.

In the event that the EHPLM listing is maintained at the memory device and the listing includes entries, then the identities of such entries are compared with buffered identities buffered at the buffer 52. The results of the comparison indicate if there is correspondence of any of the identities that are compared. If a corresponding identity exists, that is to say, an identity buffered at the buffer 52 and forming an entry in the listing 46, further determination is made as to whether the PLMN is of an access technology capability that corresponds with the desired, or needed, capability. If so, then selection is made of the PLMN, and its associated WLAN, identified by its SSID. If comparison indicates more than one identity in common and that exhibits the desired access technology capability, then, the selection is made from amongst the corresponding identities according to a prioritization scheme. In the exemplary implementation, the entries of the EHPLMN listing further identify preferences, such as a numbered ordering, to indicate a preference associated with each of the entries. If the comparison indicates availability of a plurality of PLMNs that exhibit the desired access technology capability that also are EHPLMNs, then selection is made according to the ordered preference Additionally, in the event that communication connection is not able to be completed with a first selection, then a second-preferred selection is made, if available. In accordance with this implementation, each PLMN entry on the lists 42, 44, and 46 has associated therewith an SSID 59, a preference (Pref) 60, and an access technology indicator (ATI) 61.

The apparatus further includes a user interface 62, including a display device 64 and a user input actuator 66. In one exemplary implementation, selection is made automatically by the comparator and selector 58. That is, a determination is made of the existence of an EHPLMN listing with entries. If so, then an EHPLMN whose entry has a highest priority and exhibits a desired access technology, or absent an access technology indication, is selected. In another implementation, the selection is manually made, that is, by a user of the user equipment. When the results of the comparison made by the element 58 identifies an available I-WLAN PLMN that exhibits the appropriate ATI, then the identity of the PLMN is caused to be displayed upon the display device. And, user actuation of the user actuator 66 indicates user affirmation of the selection. If more than one PLMN with the appropriate ATI is available, then the PLMNs are displayed on the display device 64, either together or sequentially. When displayed together, the user makes selection from amongst the displayed identities. Or, when the identities are displayed sequentially, the user actuates the user actuator to cause the successive displays or make selection, or non-selection, of the displayed identities.

Figure 2:
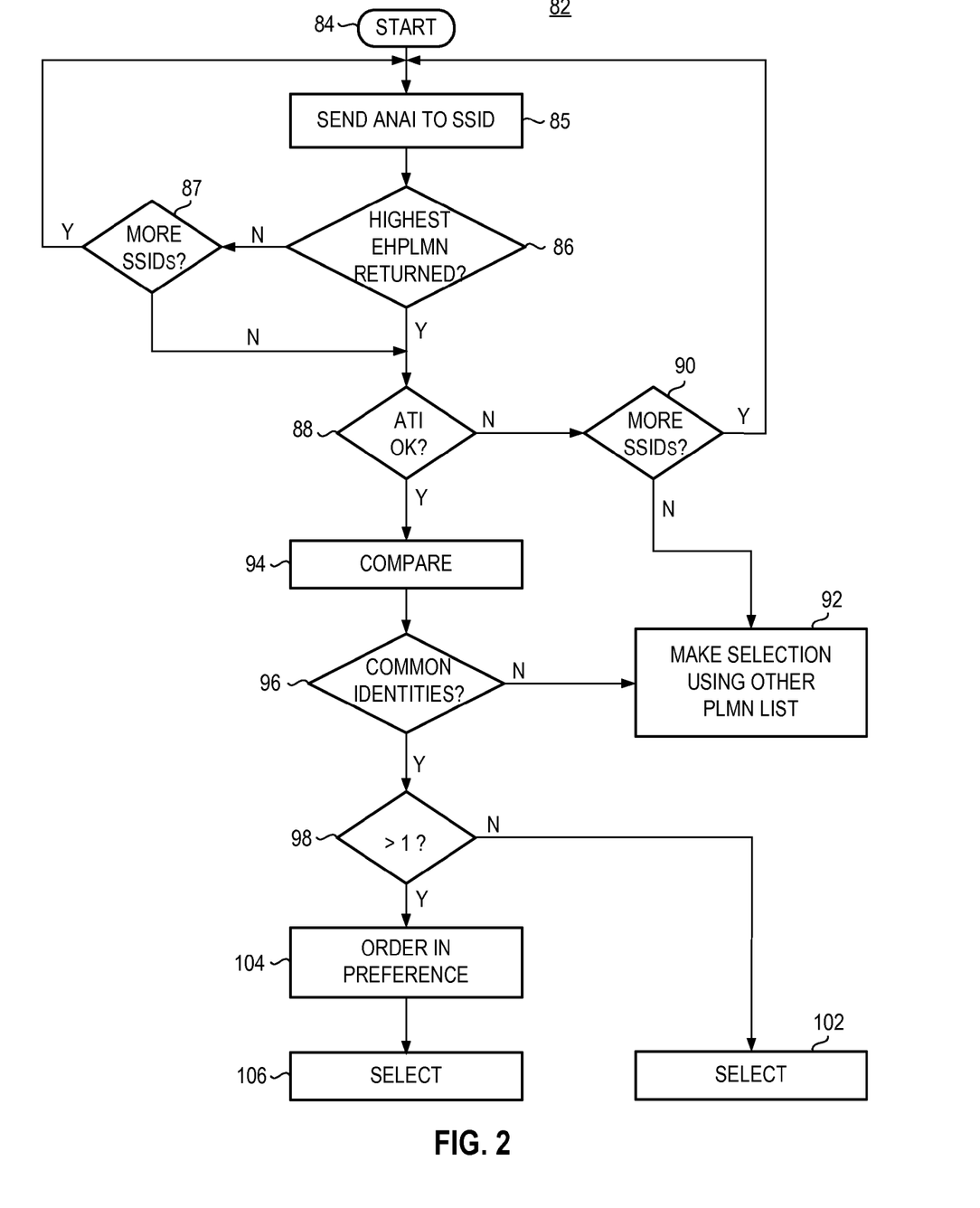
FIG. 2 illustrates a process diagram representative of the process of operation of an embodiment of the present invention.

FIG. 2 illustrates a process diagram, shown generally at 82, representative of the process of operation of an embodiment of the present invention. The process provides for selection of with which network 14, and PLMN 16 directly connected thereto, that the user equipment attempts to form a communication connection. Again, the exemplary implementation pertains to access of an EHPLMN list, analogously described.

After entry, indicated by the start block 84, the user equipment interrogates a first SSID (I-WLAN) for its list by sending, indicated by the block 85, an Alternative Network Access Identifier (ANAI). A determination is made, indicated by the decision block 86 as to whether a highest (preference) EHPLMN indication is contained in the list returned responsive to the ANAI. If not, the no branch is taken to the decision block 87, and a determination is made as to whether additional SSIDs are available to be interrogated. If so, the yes branch is taken back to block 85.

The yes branch taken from the decision block 86 and the no branch taken from the decision block 87 extend to decision block 88. A determination is made as to whether the ATI associated with the returned indication corresponds to the needed access technology capability. If not, the no branch is taken to the decision block 90 and a determination is made as to whether more SSIDs are available to interrogate. If so, the yes branch is taken back to the block 85. Otherwise, the no branch is taken to the block 92 and selection is made using a different PLMN list, if available.

If, at the decision block 88, the ATI is determined to correspond to the needed capability, the yes branch is taken to the block 94. At the block 94, comparison is made between the entries contained on the EHPLMN list and PLMN identities that are buffered at the step 86. A determination is made, indicated at the block 96, as to whether comparisons indicate whether any PLMN identities are both buffered and contained at the EHPLMN list. If not, the no branch is taken to the block 92. And, selection is made using another listing, such as a user-selected listing or an operator-selected listing. An analogous procedure is carried out to attempt to select a network that exhibits a desired ATI. Conversely, if the comparison is successful, the yes branch is taken to the decision block 98. A determination is made at the decision block 98 as to whether a plurality of PLMNs is identified during the comparison. If not, the no branch is taken to the block 102, and selection is made to attempt to form a communication connection with the WLAN with which the PLMN is associated. If, conversely, more than one identity is obtained as a result of the comparison, the yes branch is taken to the block 104, and a prioritization of the identified PLMNs is made. And, then, selection is made at the block 106 of a highest-priority, i.e., the most-preferred, PLMN and associated WLAN.

In the event that a communication connection is unsuccessful, then another PLMN and associated WLAN is selected.

Thereby, the concept of the EHPLMN is brought into I-WLAN PLMN selection. Operation determines whether an EHPLMN field is present and not empty. If not present, or is present and empty, then standard selection procedures are followed. If the field is present and contains entries, then selection is first attempted to be made of an I-WLAN PLMN noted in the EHPLMN field.

In one implementation, when network selection is to be made by a wireless device on a network other than a GERAN/UTRAN (Generic Radio Access Network/Universal Terrestrial Radio Access Network) and, if the EHPLMN listing is present but empty, then the IMSI (International Mobile Subscription Identity) is used as the HPLMN. If the EHPLMN listing is present and has no (zero) entries having access technology indications that are not populated with identifying values, or not of a second network type, then the IMSI is used as the HPLMN when automatic selection is made.

Further in this implementation, if the EHPLMN listing is present and has one entry in which the associated access technology indication field is empty or of a second network type, then the entry is selected when operated in the automatic mode.

And, if the EHPLMN listing is present and more than one entry has an associated access technology indication field that is empty, or of a second network type, then operation is according to the following selection process when in an automatic mode. Having associated with all network identifiers and having received all PLMN identities, the PLMN identities are compared with the HPLMN list entries and their ATIs. Entries with no ATI field entry are chosen and also those with the just-scanned technology. From these, the highest-priority EHPLMN is chosen. When operated in a manual mode, the entries are displayed, available for manual selection.

Figure 3:
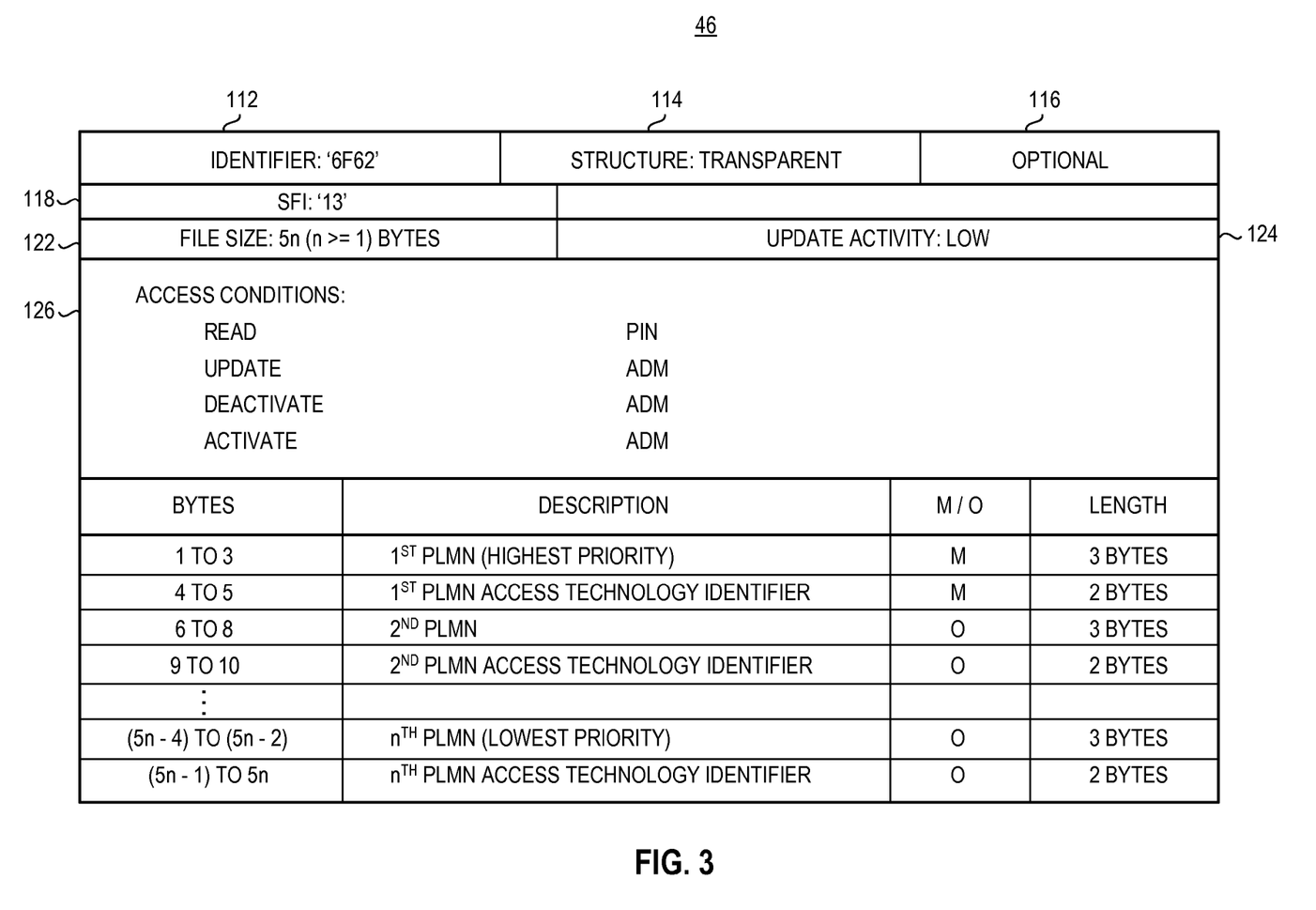
FIG. 3 illustrates an exemplary PLMN list formed pursuant to operation of an embodiment of the present invention.

Turning next to FIG. 3, the format of an exemplary EHPLMN listing 46 is shown. Listings 42 and 44 are analogous. When the EHPLMN listing is included amongst the listings at the user equipment, an indication of its presence is provided, such as an available indication at a service n 43.

The listing includes an identifier field 112, a structure field 114, an optional field 116, an SFI field 118, a file size field 122, an update activity field 124, and an access conditions field 126.

Then, PLMN identifiers and ATI identifiers are listed as entries in successive byte-groups. When there are multiple entries of PLMNs and access technology identifiers, multiple entries are included in the listing. In the exemplary implementation, the PLMN is identified by the mobile country code (MCC) followed by a mobile network code (MNC) designation that together are of up to three bytes in length. And, the ATI is up to two bytes in length. Coding is provided, e.g., pursuant to document TS 24.008 [47]. And, the contents of the access technology indicator identify the ATI that the user equipment assumes when searching for the HPLMN in priority. In this implementation, the relative priority is determined by location of the PLMN/ATI in the listing. The first-entered combination has the highest priority.

For coding, two bytes are used to select the access technology in which a bit of a value of one indicates the access technology is selected while a bit value of zero indicates the access technology is not selected.

Figure 4:
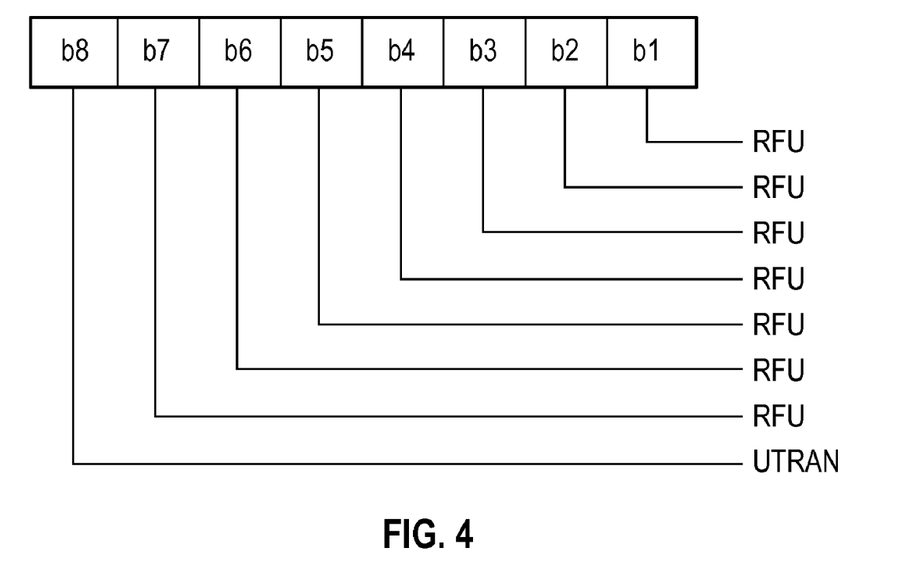
FIGS. 4, 5, 6, and 7 illustrate exemplary byte formats of identifiers.

FIG. 4 illustrates an exemplary byte, byte 5n-1 with each bit b1-b8 of a bit value. Here, bit b8 identifies UTRAN capability.

Figure 5:
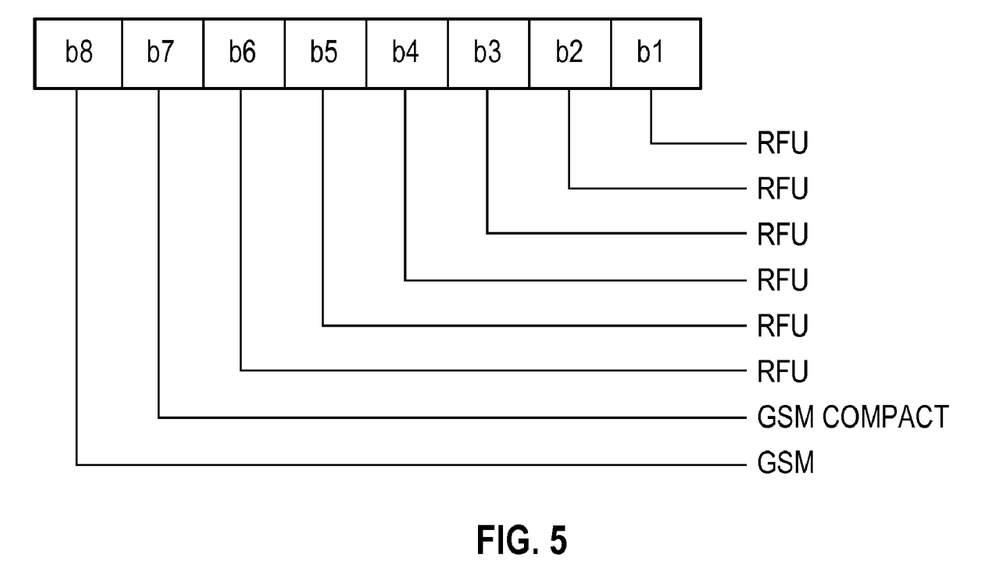

FIG. 5 illustrates a representation of an exemplary byte, here byte 5n. Here, bit b7 indicates GSM compact and bit b8 indicates GSM capability.

Figure 6:
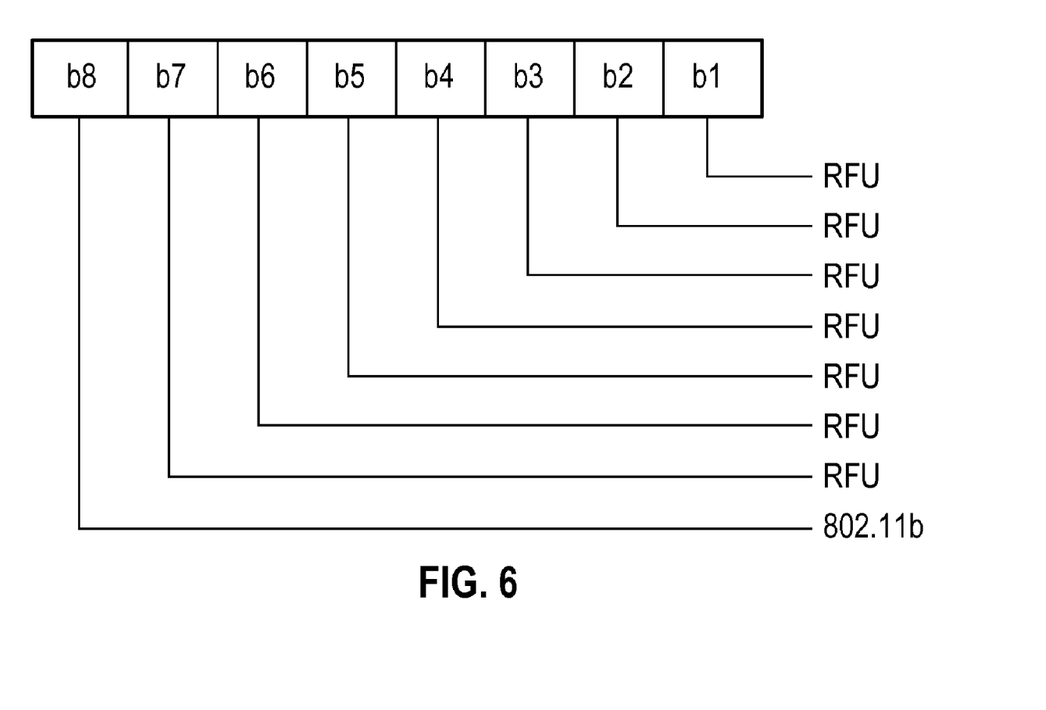

FIG. 6 illustrates another exemplary byte, here byte 5n-2. Here, bit b8 identifies 802.11b capability. In other implementations, other capabilities are defined and used, e.g., 802.11b instead is IEEE, I-WLAN, 802.11g, 802.11a, 802.11n, etc. If 802.11g defines the capability, this capability subsumes 802.11b capability.

Figure 7:
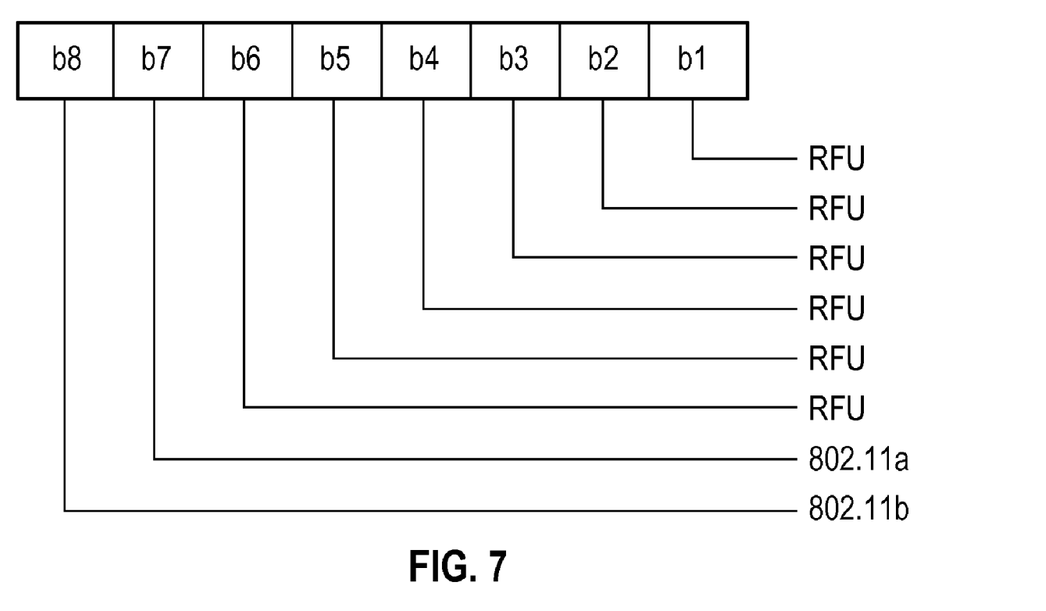

FIG. 7 illustrates another exemplary byte, again byte 5n-2. Here, bit b7 and bit b8 define 802.11a and 802.11b capabilities. The values of the bits populating such locations are determinative of the identified, access technology capability and form the ATI associated with the PLMN.

Figure 8:
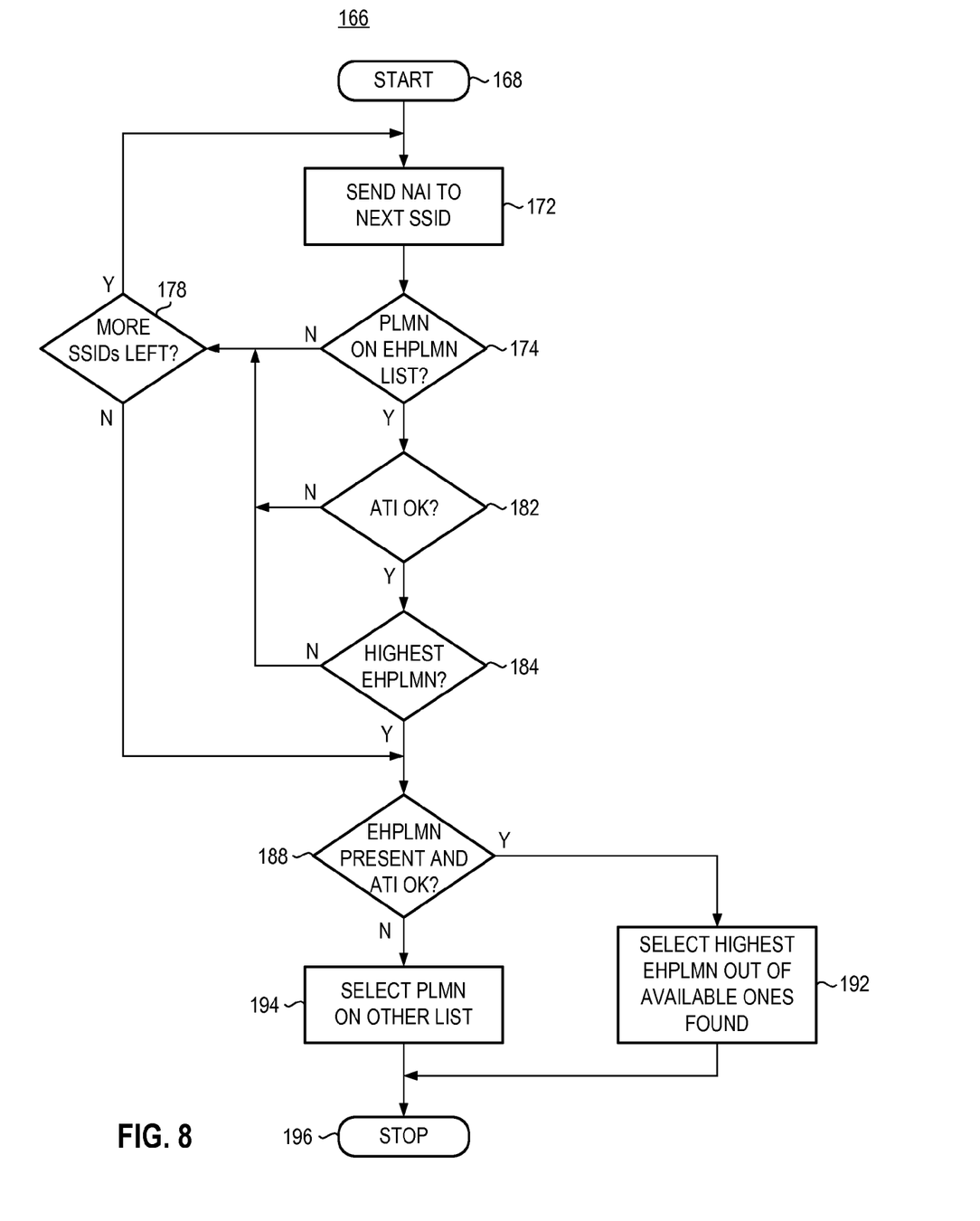
FIG. 8 illustrates another process diagram representative of the process of operation of an embodiment of the present invention.

FIG. 8 illustrates another process diagram, shown generally at 166, representative of operation of an embodiment of the present invention. The process described in the diagram provides for selection of a network by a user equipment, or other wireless device.

Subsequent to start, indicated by the start block 168, a network access identifier (NAI) is sent to a next SSID (Service Set Identifier) as indicated by block 172. Then, and as indicated by the decision block 174, a decision is made as to whether a PLMN is included as an entry on an EHPLMN list returned in response to the NAI. If not, the no branch is taken to the decision block 178.

At the decision block 178, a determination is made as to whether additional SSIDs remain. If so, a path is taken back to the block 172, and the NAI is sent to another SSID.

If a positive determination is made at the decision block 174, a yes branch is taken to the decision block 182. At the decision block 182, a further determination is made as to whether an ATI associated with the identified entry is acceptable. If not, the no branch is taken back to the decision block 178. If, conversely, a positive determination is made at the decision block 182, the yes branch is taken to the decision block 184. At the decision block 184, a further determination is made as to whether the identified entry is a highest-preference EHPLMN. If not, the no branch is also taken back to the decision block 178.

If, conversely, a positive determination is made at the decision block 184, the yes branch is taken to the decision block 188. The no branch from the decision block 178 also extends to the decision block 188. At the decision block 188, a determination is made as to whether the EHPLMN entry is present and the ATI is acceptable. If so, the yes branch is taken to the block 192, and the highest-preference EHPLMN is selected out of the detected and available entries. If conversely, a negative determination is made at the decision block 188, the no branch is taken to the block 194. And, at the block 194, a PLMN is selected from another list. And, paths extend from the blocks 192 and 194 to the stop block 196.

In a further embodiment of the present invention, additional access technology identifiers, or other information, associated with a PLMN entry is further provided. The additional information of ATI is further utilized pursuant to SSID or associated PLMN selection. In one implementation, for instance, the information is usable to resolve between, that is, make selection between, EHPLMs available by way of separate SSIDs. Their implementations, the additional information is used for other purposes, such as, e.g., to provide additional selection-resolution, criteria indicia. The additional information is used, in an analogous implementation, to direct selection of an I-WLAN with which a home network operator, associated with the wireless device, has a most-beneficial, commercial relationship.

Figure 9:
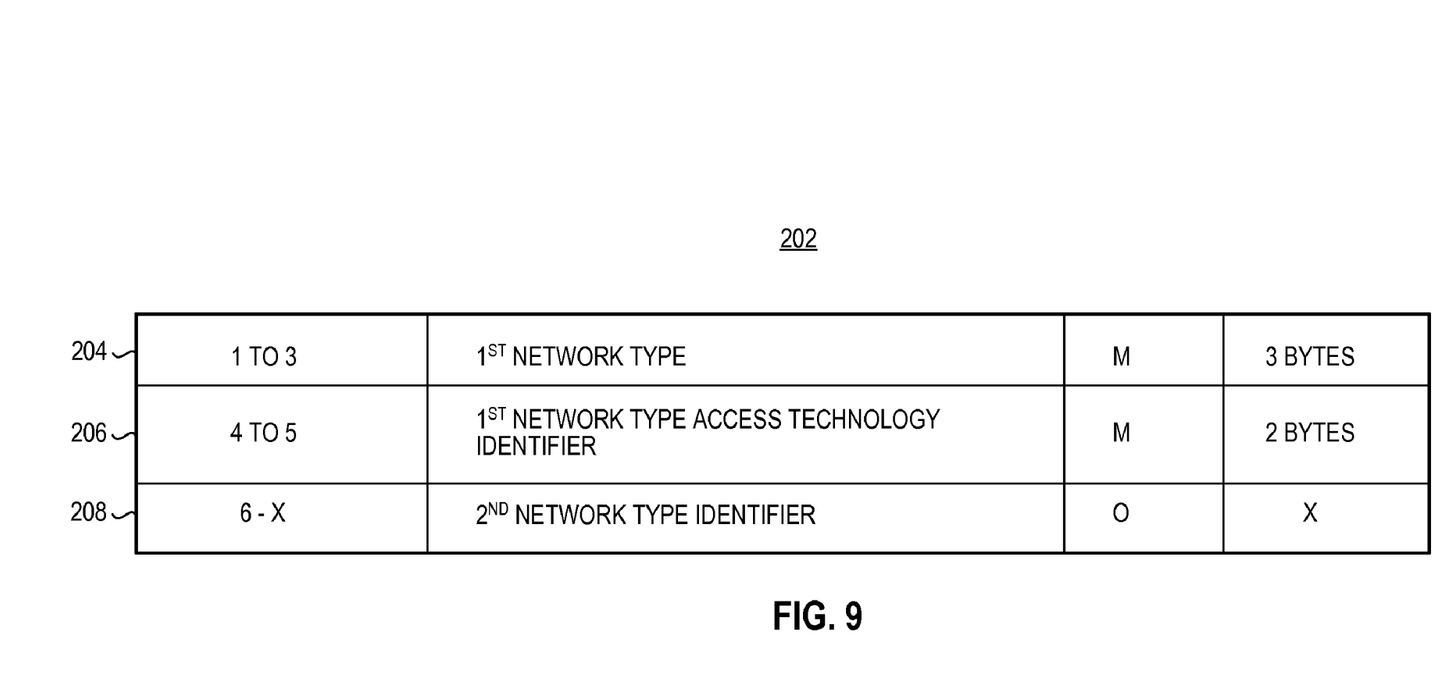
FIG. 9 illustrates a representation of an exemplary file structure of a file formed pursuant to a further embodiment of the present invention.

FIG. 9 illustrates a general file structure 202 of a further embodiment of the present invention. Here, the file includes a first field 204 that identifies a network type, a second field 206 that identifies an access technology identifier of the network type identified in the field 204. And, the file also includes at least one additional field 208 that provides at least a second identifier associated with the network identified in the field 204. Additional fields analogous to the field 208 are additionally formable if desired.

Figure 10:
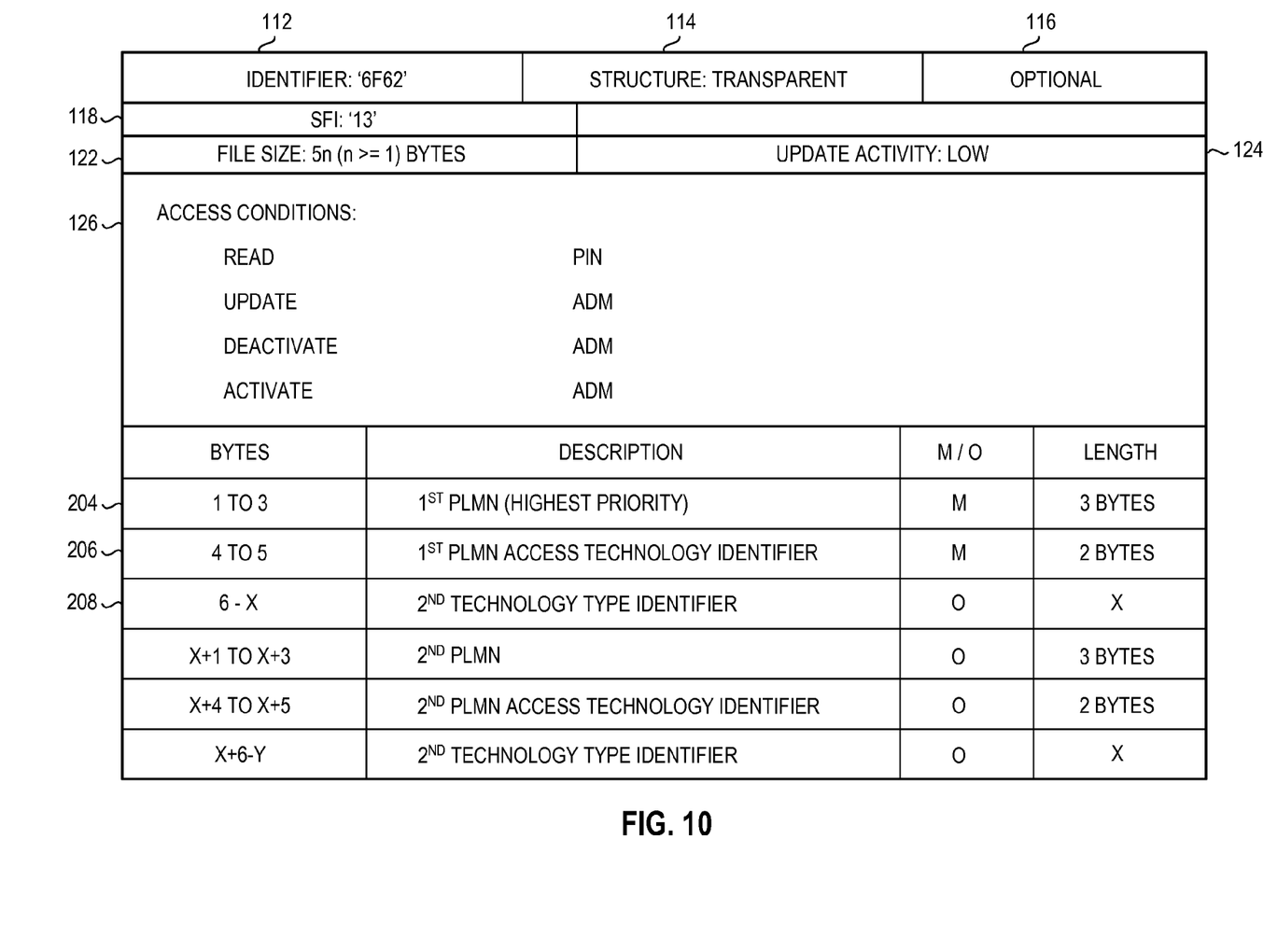
FIG. 10 illustrates an exemplary PLMN list, similar to that shown in FIG. 3, but here including the file structure shown in FIG. 9.

FIG. 10 illustrates a listing 46, similar to the listing shown in, and described with respect to, FIG. 3. Again, the listing includes fields 112-126. Here, the listing includes the fields 204, 206, and 208 that form parts of the exemplary file 202 shown in FIG. 9. The additional field 208 provides further indicia to facilitate SSID/PLMN selection, such as above-described selection resolution.

Figure 11:
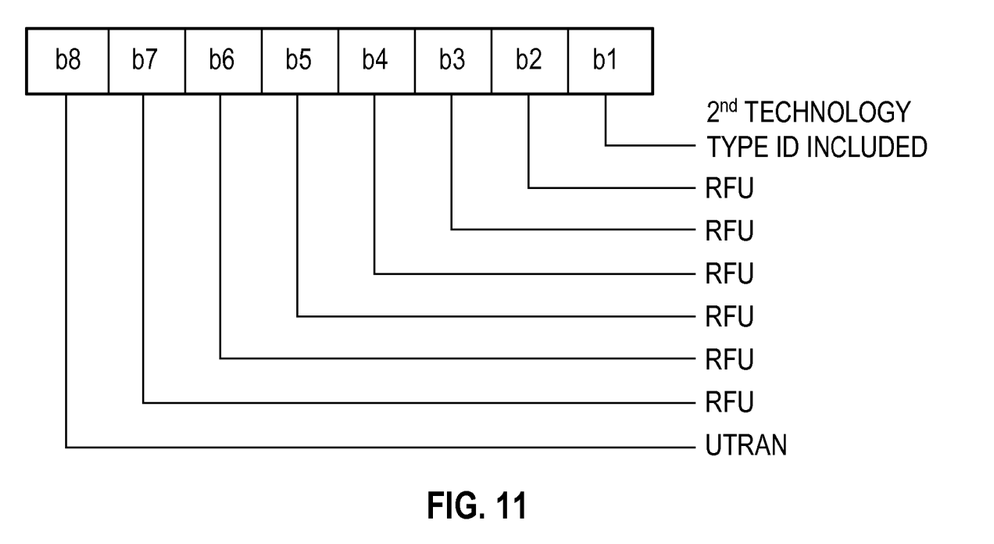
FIGS. 11-12 illustrate exemplary byte structures used pursuant to a further embodiment of the present invention.

FIG. 11 illustrates an exemplary byte, here byte 5n-1 that identifies an ATI setting. Each bit b1-b8 is of a bit value. Here, bit b8 identifies UTRAN capability and bit b1 identifies that a second technology type ID is included.

Figure 12:
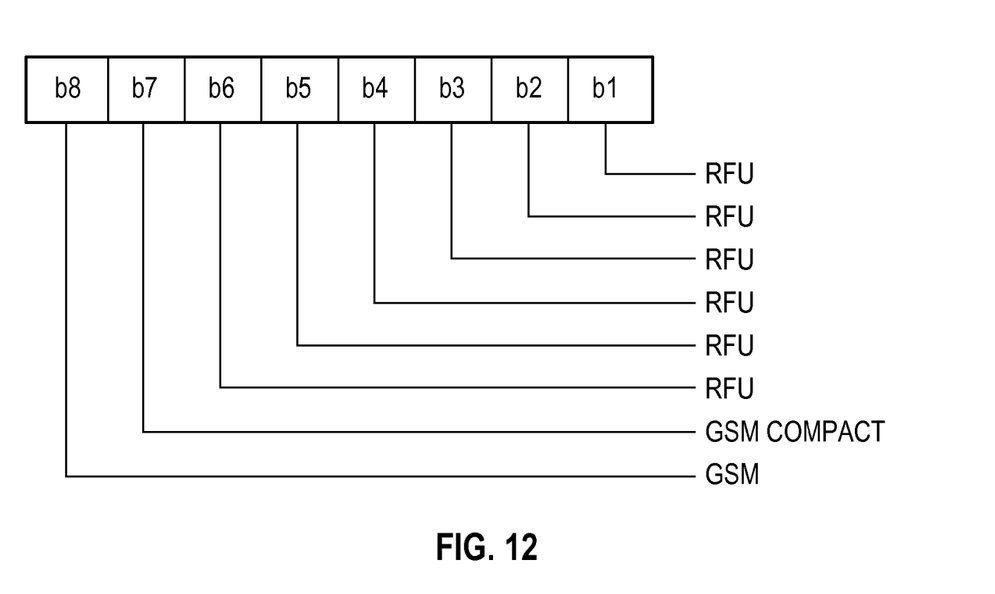

FIG. 12 illustrates a representation of another exemplary byte, here byte 5n. Here, bit b7 indicates GSM compact and bit b8 indicates GSM capability.

Because the listing includes a further indication of the access technology capability of the associated network, a determination is able to be made quickly as to whether the I-WLAN PLMN should be selected as the target PLMN. A list of available PLMNs is buffered and compared with a listing of PLMNs, such as an EHPLMN listing. The listing includes a field that indicates the access technology capability of the associated PLMN. The decision of which PLMN to form a target PLMN takes into consideration the access technology capability of the PLMN.

What is claimed is:

1. Apparatus for facilitating Public Land Mobile Network, PLMN, selection at an Interworking-Wireless Local Area Network, I-WLAN, compatible wireless device, said apparatus comprising:

a memory device configured to store at least a PLMN listing and an Equivalent Home Public Land Mobile Network, EHPLMN, listing of home network entities capable of providing communications, said PLMN listing including a PLMN identity field and said EHPLMN listing including an I-WLAN identity field and an associated access technology indicator, ATI, field, the contents of which identifies a particular access technology of a plurality of access technologies used by the wireless device for a respective stored I-WLAN identity;

a detector configured to detect a list broadcast by an I-WLAN identifying PLMN identities coupled to said I-WLAN; and a comparator-and-selector that determines whether said EHPLMN listing contains any entries, interrogates said EHPLMN listing first if entries are found, and interrogates said PLMN listing if no entries are found, said comparator-and-selector configured to receive detected PLMN identities from said detector, compare said stored ATI content of said EHPLMN listing to a desired ATI, compare said detected PLMN identities to said EHPLMN listing stored I-WLAN identity, and select for communication an I-WLAN-associated PLMN identity that is both detected by said detector and determined to have said desired ATI.

2. The apparatus of claim 1 wherein said detector is configured to detect broadcast of the PLMN identities.

3. The apparatus of claim 2 wherein the broadcast of the I-WLAN identifying PLMN identities is made responsive to request made by the wireless device.

4. The apparatus of claim 3 further comprising a detector buffer configured to buffer the I-WLAN PLMN identities detected by said detector.

5. The apparatus of claim 4 wherein comparisons made by said comparator-and-selector are made between entries buffered at said detector buffer and an entry of the first EHPLMN listing.

6. The apparatus of claim 5 wherein the desired access technology identifier is representative of Wi Fi capability.

7. The apparatus of claim 1 wherein the access technology field of said at least one PLMN listing of said memory device comprises a plurality of access technology fields.

8. The apparatus of claim 3 further comprising an alternative network access, ANAI, generator to generate an ANAI signal that precipitates a return from said I-WLAN of a list identifying PLMNs coupled to the I-WLAN.

9. The apparatus of claim 1 wherein said EHPLMN listing further includes a preference field associated with said I-WLAN identity field.

10. The apparatus of claim 9 wherein said comparator-and-selector are further configured to select an I-WLAN-associated PLMN identity having a highest preference indicium in said preference field of PLMNs both detected and having the desired ATI.

11. A method for facilitating Public Land Mobile Network, PLMN, selection at an Interworking-Wireless Local Area Network, I-LAN, compatible wireless device, for facilitating PLMN selection, said method comprising the operations of:

storing, in a memory device of the wireless device, at least a PLMN listing and an Equivalent Home Public Land Mobile Network, EHPLMN, listing of home network entities capable of providing communications, said PLMN listing including a PLMN identity field and said EHPLMN listing including an I-WLAN identity field and an associated access technology indicator, ATI, field the contents of which identifies a particular access technology of a plurality of access technologies used by the wireless device for a respective stored I-WLAN entity;

detecting, by a detector of the wireless device, a list broadcast by an I-WLAN identifying PLMN identities coupled to said I-WLAN;

determining whether said EHPLMN listing contains any entries, interrogates said EHPLMN listing first if entries are found, and interrogates said PLMN listing if no entries are found;

comparing said stored ATI of said EHPLMN listing to a desired ATI;

comparing said detected PLMN identities to said EHPLMN listing stored I-WLAN identities; and selecting a detected I-WLAN associated PLMN identity that both matches said EHPLMN listing identities and is determined to have said desired ATI.

12. The method of claim 11 wherein the desired access technology identifier of the access technology field is representative of a Wi Fi capability.

13. The method of claim 11 further comprising the operation of populating the PLMN identity field with a PLMN identity.

14. The method of claim 11 further comprising the operation of populating the access technology field with an access technology identity.

15. The method of claim 11 wherein said EHPLMN listing further includes a preference field associated with said I-WLAN identity field further comprising the operation of selecting an I-WLAN-associated PLMN identity having a highest preference indicium in said preference field of PLMNs both detected and having the desired ATI.

16. The method of claim 11 further comprising the operation of buffering said detected list.

17. The method of claim 11 further comprising the operation of generating an alternative network access, ANAI, signal that precipitates a return from said I-WLAN of a list identifying PLMNs coupled to the I-WLAN.

* * * * *